350-385 SR
XR 3,588,324
X 4009 N
4021 Y
X 4048 D X4015T
(6)
SEARCH ROOM

[redacted]

United Sta

[11] 3,588,324

[72] Inventor Jerard Marie
L'Hay-les-Roses, France
[21] Appl. No. 632,273
[22] Filed Apr. 20, 1967
[45] Patented June 28, 1971
[73] Assignee U.S. Philips Corporation
New York, N.Y.
[32] Priority Apr. 22, 1966
[33] France
[31] 58739

[54] COLOR IMAGE PROJECTORS

14 Claims, 5 Drawing Figs.

[52] U.S. Cl. .......... 178/5.4, 350/160, 350/150
[51] Int. Cl. .......... H04n 9/14
[50] Field of Search .......... 178/5.2, 5.4, 5.4 (BDP); 350/150, 160; 250/199

[56] References Cited

UNITED STATES PATENTS

| | | | |
|---|---|---|---|
| 2,616,962 | 11/1952 | Jaffe | 178/5.4(BDP) |
| 2,705,903 | 4/1955 | Marshall | 178/5.4(BDP) |
| 2,753,763 | 7/1956 | Haines | 178/5.4(BDP) |
| 3,069,973 | 12/1962 | Ames | 350/150 |
| 3,383,460 | 5/1968 | Pritchard | 178/5.4(BDP) |
| 3,428,743 | 2/1969 | Hanlon | 178/5.4(BDP) |
| 3,340,356 | 9/1967 | James | 178/5.4(4TCC) |

*Primary Examiner*—Richard Murray
*Assistant Examiner*—Richard P. Lange
*Attorney*—Frank R. Trifari

ABSTRACT: A projection system for displaying color television signals in which polarized light is first directed to two or more optical relays for rotation as a function of low definition color signals. The chrominance relays may be either in series or parallel with respect to the light. The resultant light beam is then rotated as a function of a high definition luminance signal, and applied to a projection system by way of an analyzer arranged to pass light that has been rotated 90°.

INVENTOR.
GERARD MARIE

BY

AGENT

INVENTOR.
GERARD MARIE
BY
[signature]
AGENT

INVENTOR.
GERARD MARIE
BY
AGENT

COLOR IMAGE PROJECTORS

This invention relates to color image projectors for displaying a color television signal consisting of a luminance signal and at least two color signals, comprising a light source emitting a light beam, a single polarizer for polarizing the light beam passing through it, a single analyzer which transmits only light having a direction of polarization which is turned by approximately 90° relative to that of the polarizer, and at least two elements for turning the direction of polarization of the light transmitted by the polarizer, as a function of the two color signals.

It is known that in a color television receiver, and especially in the display tube of such a receiver, the electron beam emitted by the electron gun fulfills three functions:

a. It provides the energy which must appear in the form of light.
b. It brings about spatial image scan.
c. It provides for the image information on the screen.

In French Pat. application PV 47,357 "Relais optique Notamment pour projecteur de television," of Jan. 26, 1966, filed in the name of the Applicant (corresponding U.S. application Ser. No. 611,306, filed Jan. 24, 1967), it has already been suggested to separate the function (a) from the two other functions by using a light source which is independent of the electron beam, the latter being capable of modifying the crystalline state of a thin plate having electro-optical effect. However, this device was intended only for use in a black-and-white transmission.

A set of three analogous devices could constitute indeed a color television projector operating on the additive principle. It is known that for this purpose use is commonly made of three signals R, G and B which control the intensity of the three primary colors red, green and blue. It is also known that the human eye is sensitive only to the luminance of the fine details of the image, the luminance being represented by a function of the three signals R, G, B, usually as Y=0.59G+*b8* 0.30R+0.11color triangle having the values specified below:

red: $x$=0.67, $y$=0.30
green: $x$=0.21, $y$=0.71
blue: $x$=0.14, $y$=0.08

For a given luminance, the chrominance may be restored with a three times lower definition without the eye being capable of observing this difference. Let it be assumed that R', G', B', and Y' are the narrow-band signals required for correct color vision and that R'', G'', B'', and Y'' are their complements for obtaining the broadband signals:

$R=R'+R''$
$G=G'+G''$
$B=B'+B''$
$Y=Y'+Y''$

The television transmitter emits only one broadband luminance signal Y=Y'+Y'' and two narrow-band color signals. Upon reception, the third color is formed by combination of the signals received. If the incoming signals are Y', R', B' there is deduced therefrom:

$$G'=\frac{Y'-0.30R'-0.11B'}{0.59}$$

To obtain an image of high definition it suffices to feed the three classic display tubes with the colors red, green and blue or the following signals:

R'+Y''
G
B'+Y''

The difference between these signals and the high-definition signals R, G, B cannot be observed with the human eye. This additive color mixing requires three tubes of high definition.

The projector according to the present invention is characterized in that the polarizer and the analyzer are separated by means for dividing the light beam into at least two beams each of a certain color complement, the two beams each being directed onto the said elements, and means being provided for recombining the two partial beams after passing through the elements to form a single beam, and another element for turning the said direction of polarization, which is arranged either between the polarizer and the dividing means or between the recombining means and the analyzer.

Another embodiment of the projector according to the invention is characterized in that the polarizer and the analyzer are separated by at least two elements placed in series, means being arranged in front of each element which transmit the light of a certain color and reflect the light of at least one other color, the transmitted color being reflected in the element, the direction of polarization being turned as a function of the color signal corresponding to the relevant color and applied to the element, and either between the polarizer and the said two elements or between the latter and the analyzer a further element being arranged in series, which likewise reflects the beam impinging on it and whose direction of polarization is turned as a function of the luminance signal applied to this further element.

The said projector produces a color image formed invention; a luminance signal and three color signals, the light being composed of three beams red, green and blue, the beams each passing through a separate color element and then, after superposition, through the common brightness element, the appropriate signals being fed to each of the said elements.

The color elements need only a low definition and the brightness element must have a high definition.

Each element may be analogous with the element described in the above-mentioned French patent application except the polarizers. The elements, the electron beam for scanning the crystal and the appropriate circuits are now generally denominated as "optical tube" or "optical relay."

The advantages of a method as herein described will readily be evident. The use of three tubes of low definition and only one tube of high definition is much more economic than the use of three tubes of high definition. This saving especially results from the simplified construction of the tube and the associated circuits and a scan may be effected, for example, with three times fewer lines and dots per line for the chrominance than for the luminance. On the other hand, the color tubes or color elements can be scanned either simultaneously or in succession, this avoiding a delay line or a memory in the case of sequential transmission of the color information. Further, the recombination of the partial beams may take place for an image of low definition and the problem of the superposition is considerably simplified. Also the color image obtained at the output of the receiver may be projected on a wide screen by using a light source of high intensity. For scanning the crystalline state or a Kerr cell it is also possible to use a light beam instead of an electron beam. Lastly, the said method affords the advantage that only one polarizer and only one analyzer are required, since the incident beam and the emerging beam are one and the same. In known arrangements use was always made of a pair, namely a polarizer and an analyzer, for each color element. Since the losses thereof are considerable it will be evident that the reduction of the number of pairs from 3 to 1 implies a much higher efficiency of the light employed.

In order that the invention may be readily carried into effect it will now be described in detail, by way of example, with reference to the accompanying diagrammatic drawing, in which.

Figure 1:
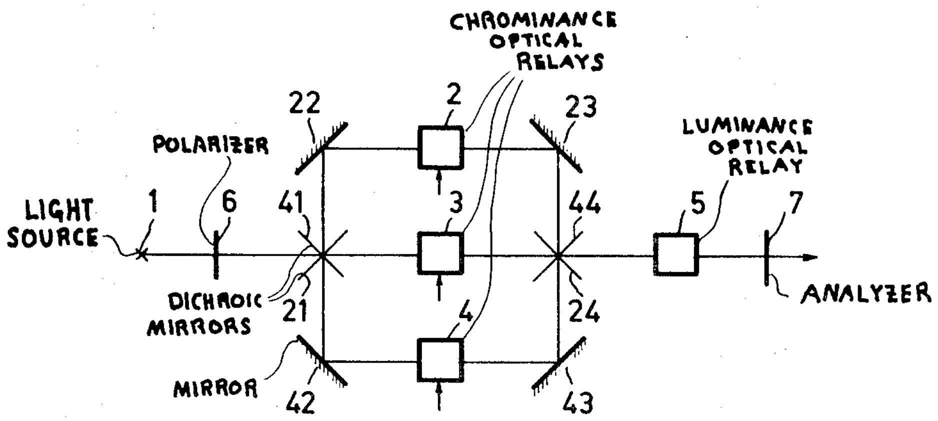
FIG. 1 shows a projector according to the invention.

The system shown in FIG. 1 comprises three optical relays 2, 3, 4 of low definition for the chrominance and one optical relay 5 of high definition for the luminance, said relays responding, for example, to the transmission of light. In this FIG., the light energy is provided by a single source 1, but it could alternatively originate from three different sources. The light beam is polarized by a first polarizer 6 arranged in front of the three optical color relays 2, 3 and 4. The light beam is divided into three beams red, green and blue by two dichroic mirrors 21 and 41. The polarizer 6 could otherwise be replaced by three polarizers which are arranged behind the dichroic mirrors 21 and 41 to ensure that these polarizers act only in limited regions of the light spectrum. An analyzer 7 is arranged behind the luminance relay 5. It is important to avoid any polarizer between the chrominance relays 2, 3 and 4 and the luminance relay 5 since such an arrangement would imply an intensity modulation and hence a low light efficiency. In fact, if the four relays directly modulate the beam intensity, they can have only multiplicative effects with a factor which is always smaller than or equal to unity. Since the relay 5 is fed with the signal Y=Y'+Y'', the red relay 2 must be fed with the narrow-band signal R'/Y' the green relay 3 with the signal G'/Y' and the blue relay 4 with the signal B'/Y'. The restoration of, for example, the red color regions, the luminance of which is low: Y'=0.30 for R'=1, G'=B'=0, would correspond to a signal R'/0.30=Satisfactory reproduction of the red would therefore necessitate reduction of the total light intensity by a factor of 3.33. In other words, the modulation of the red relay 2 and that of the luminance relay 5 are added algebraically. The modulations of the green relay 3 and the relay 5 are subtracted algebraically or the same is true of the relays 4 and 5. For the blue, a similar reproduction would necessitate a reduction by a factor of 9. It is therefore of paramount importance to modulate only a reversible light curve. In practice this curve will be a polarization curve which can be influenced electro-optically and magneto-optically. At the output of the chrominance elements 2, 3, 4 corresponding to the light beams blue, green and red, these beams are superimposed on one another by means of dichroic mirrors 24 and 44 and pass through the optical luminance relay 5. Ordinary mirrors or totally reflecting prisms are indicated by 22, 23, 42 and 43. If the chrominance relays are fed with the narrow-band signals B'−Y''−Y', R'−Y' and the luminance relay 5 is fed with the broadband signal Y=Y'+Y'' the total phase shifts occurring between the two light wave components having relatively perpendicular directions of polarization are proportional to respectively:

B'+Y''
G'+Y''
R'+Y'' and the light intensities of the primary colors are proportional to respectively:

$\sin^2 k\,(B'+Y'')$
$\sin^2 k\,(G'+Y'')$
$\sin^2 k\,(R'+Y'')$ at the output of the analyzer 7 if this is crossed by the polarizer 6.

The colors are thus restored with complete balancing without loss of total light intensity and with a gamma in the vicinity of 2, that it to say of the same order of magnitude as that of classic display tubes. It should be noted that the chrominance relays 2, 3, 4 could alternatively be fed with the signals R', G', B' and the luminance relay 5 with the signal Y'', which contains only the high frequencies. Further, it is possible to choose an arrangement which is symmetrical with that of FIG. 1 by causing the light beam to be modulated first by the luminance relay and then by the chrominance relays. However, this arrangement seems to be not particularly advantageous, since beams originating from an image of high definition are split up by means of dichroic mirrors and then recombined, which requires a higher accuracy of control than in the case of superposition of beams originating from images of lower definition.

Figure 2:
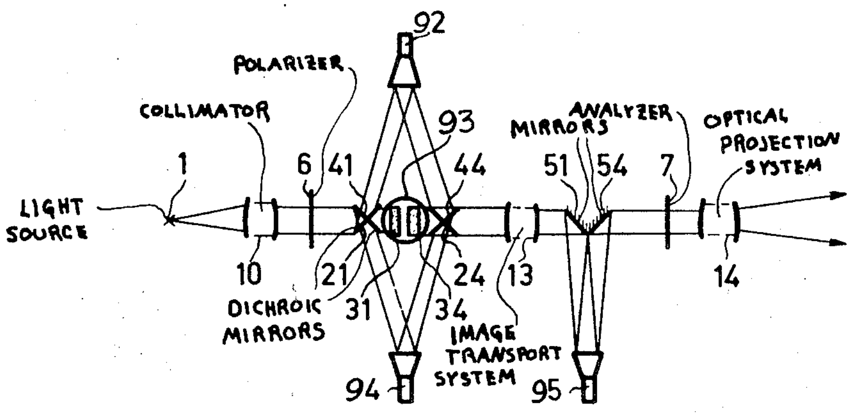
FIG. 2 shows a first circuit of the various elements used with the invention.
Figure 3:
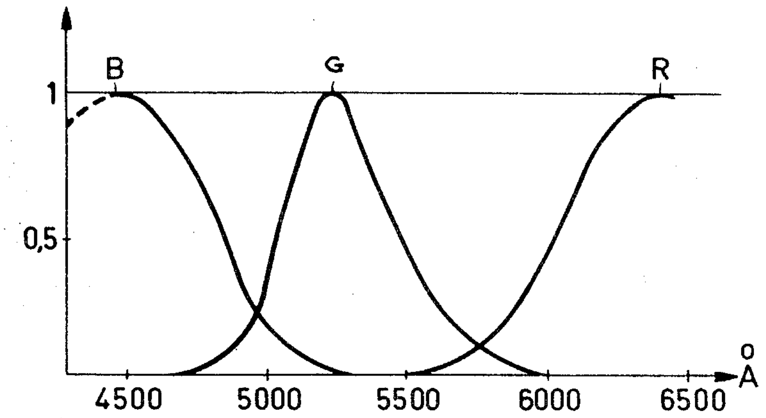
FIG. 3 shows the response curves of the various phosphors used in classic color tubes.

FIG. 2 shows an arrangement which can be used for the optical relays operating with reflection. It also shows a collimator 10 for the light emerging from the source 1, an optical image transport system 13 the function of which is to make the image fields of the tubes 92, 93 and 94 coincide with that of the tube 95, and an optical projection system 14. The tube 93 is at right angles to the plane of the FIG. The dichroic mirrors 21 and 24 can be identical with the blue reflecting dichroic mirrors used in the color pickup cameras and the dichroic mirrors 41 and 44 can be identical with the red reflecting mirrors of the same cameras. The mirrors 31, 34, 51 and 54 are either ordinary mirrors or totally reflecting prisms which reflect the whole of the spectrum. It may readily be calculated that the spectra of the three beams, which are reflected by 21 and 24, reflected by 41 and 44, and transmitted by 21, 41, 24, 44 respectively lie very close to the spectra of the phosphors shown, by way of example, in FIG. 3 and which can reproduce primary colors B, G, R with the desired colorimetric coordinates $x$ and $y$. To improve the saturation of the primary colors G and R, the limit wavelengths of the filters 41 and 44 may be somewhat shifted towards the smaller wavelengths and between 41 and tube 4 there may be arranged a filter having characteristics which closely approximate to, for example, those of the "Wratten" filter 25, in order to eliminate the colors yellow and orange of the spectrum more completely. It should be noted that the mirrors, which are at an angle of 45° to one another, may cause a phase shift between the polarized components which is parallel and at right angles to the plane of incidence. To prevent this phase shift from interfering with the state of polarization of the light between the chrominance tubes and the luminance tube, this state may be balanced, for example, by means of a phase shifting plate (quartz or mica plate) or a film of synthetic material.

Figure 4:
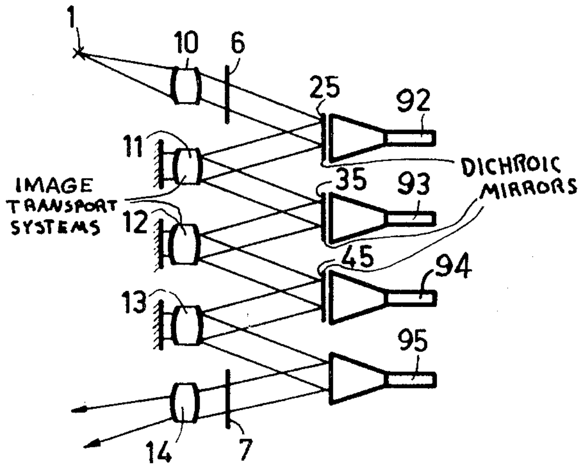
FIG. 4 shows another embodiment of the invention.

FIG. 4 shows another arrangement in which the various tubes 92, 93, 94 and 95 are arranged in series. It is then necessary to use two additional optical image transport systems 11 and 12. These may comprise, for example, in analogy with the image transport system 13, a classic objective lens which acts with autocollimation. To ensure that the primary colors R, G and B are modulated only by the tubes 92, 93 and 94 respectively and by the tube 95, each tube must be preceded by a dichroic mirror (25, 35 or 45) which transmits only one primary color and which reflects the two other colors. Let it be assumed that the mirror 25 reflects, for example, green and blue and transmits red. This red is then reflected by the crystal plate in the tube 92 and, during this reflection, the direction of polarization of the red light will be displaced more or less as a function of the red signal which is fed back to the tube 92. The red light is transmitted again by the mirror 25. The beam which reaches the mirror 35 via the mirror 11 thus contains blue and green the direction of which has not and red the direction of which has been turned. The same is true of green and blue in the tubes 93 and 94 respectively. The reflection curves of the tubes 92, 93 and 94 must be similar to those of the phosphors of FIG. 3 as far as possible. One may choose for 25 a mirror of the same type as 41 by shifting its limit wavelength towards the blue. Similarly, one may choose for 45 a mirror of the same type as 21 by shifting its limit wavelength towards the red. As far as the mirror 35 is concerned, this may consist of either two mirrors arranged one above the other, such as 21 and 41, or a Fabry-Perot filter which is tuned to 5,250 Angstroms and has, for example, in the middle of its height a bandwidth of from 400 to 500 Angstroms.

It should be noted that the colors which are transmitted by none of the three mirrors (for example yellow and orange) are absorbed by the polarizer 7 which is crossed by 6. To avoid magnification and adjustment errors it is necessary to ensure that the mirrors 25, 35 and 45 are located as close as possible to the image fields of the tubes. Since mirrors are concerned which act on one another and which are generally not thicker than 1 micron, there is no objection at all in incorporating them in the tube by providing them either on the front of the crystalline plate (preferably over the permeable conductive layer) or on the carrier for the plate. The second arrangement has a simpler adjustment, since the centering operations are much less numerous than in FIG. 2. However, it has the disadvantage that two additional image transport systems must be used, which otherwise need produce only an image of low definition, thus simplifying their construction and adjustment.

Further, the dichroic mirrors act with an apparently normal incidence which simplifies their manufacture and suppresses the interfering phase shifts with the 45° mirrors.

With respect to the conventional arrangements which utilize three tubes of high definition (600 lines × 800 points), the arrangement according to the invention utilizes only one tube of high definition (the luminance modulator) and three tubes of low definition (200 lines × 260 dots), that is to say approximately three times fewer lines and three times fewer dots (the color modulators). This simplifies the construction of the three color modulators and reduces their manufacturing cost. In fact, it is possible to use a crystal plate having a nine times smaller surface area and which acts at a nine times lower intensity and density of the electron beam than in a tube of high definition, thus permitting an important simplification of the electronic lens system and a reduction in the volume of the tubes in a ratio which in theory may be 27. Furthermore it has been found that the superposition adjustments of the images are facilitated by the low definition of the color images. It is also known that optical relays having electro-optical effect of the type used in the previously mentioned patent application have an almost perfect memory between two scans. The scan may therefore take place on the various tubes independently of one another, thus avoiding a delay line or a memory in sequential transmission of the color information.

The present invention is not limited to the embodiments described and illustrated, numerous modifications being possible within the scope of the invention.

The invention can also be used in all those domains in which an image, colored or not, must be produced by combination of a plurality of fields, the fields differing in time because of their content as well as their scan curves or transmission curves. The invention can be used in all fields in which an image is needed having a luminance which is qualitatively superior to that of a given image and the projection of which affords well-known advantages.

Figure 5:
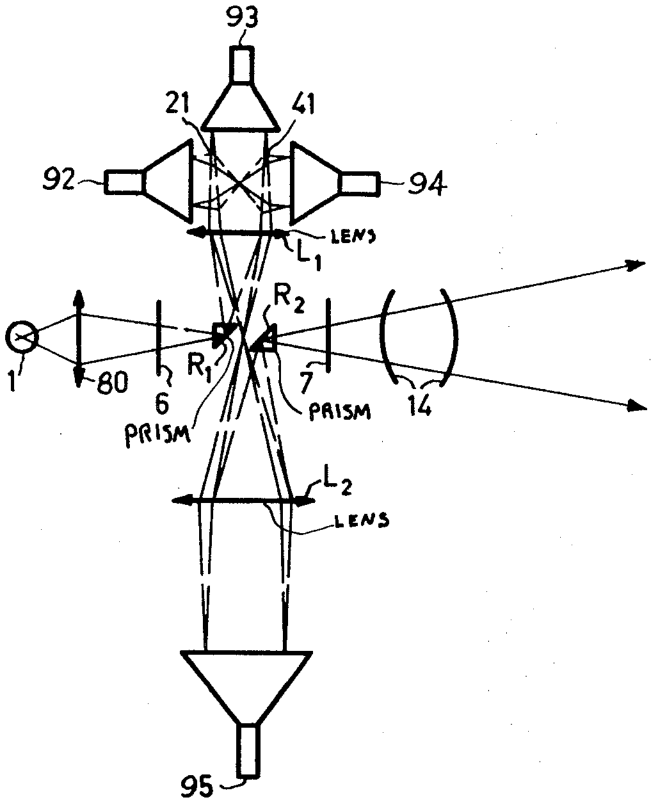
FIG. 5 shows another embodiment of the invention.

FIG. 5 shows another embodiment in which the independent light source 1, may be, for example, an arc lamp. A condenser 80 throws an image of the arc onto a mirror $R_1$ of small dimensions, in this case a totally reflecting prism. The light is polarized by the polarizer 6 arranged between 10 and $R_1$. The said prism is positioned at the focus of an optical element $L_1$ having a focal length $f_1$. In order to reduce aberrations and chromatism, use is preferably made of a double prism. Because of the small dimensions of the image produced by the element on $R_1$, the rays emerging from $L_1$ extend substantially in parallel.

The tubes 92, 93 and 94 modulate the primary colors red, green and blue, respectively. The light is again divided into three beams R, V and B by means of two suitably arranged dichroic mirrors 21 and 24. The perpendiculars to the target plates are slightly inclined to the axes of the three beams (for example, of the order of 1°) so that the reflected light is concentrated near the mirror $R_1$ at the focus of an optical element $L_2$ having a focal length $f_2$. Thus the rays emerging from this optical element will extend substantially parallel and reach the luminance modulation tube 95. The normal to the surface of the target plate is slightly inclined to the beam so that the reflected beam is concentrated on a mirror $R_2$ near $R_1$, which mirror $R_2$ may likewise be a totally reflecting prism.

The optical system used for projection is also shown diagrammatically at 14. It is preceded by a polarizer 7 which is crossed relatively to the polarizer 6. The polarizers 6 and 7 are, for example, of the type "Polaroid." They may advantageously be substituted by totally reflecting prisms of the type BRACE or GLAZEBROOK or by polarization prisms having multidielectric layers. The projector of FIG. 5 has the further advantage that it utilizes only two dichroic mirrors. The assembly comprising the optical elements $L_1$ and $L_2$ fulfills the function of an image transport system the magnification of which is equal to the ratio between the dimensions of the images on the luminance tube and on the color tubes. The target plates of the tubes may also be positioned at the foci of these optical elements, the magnification then being equal to the ratio between the focal lengths.

In one variant the target plates are greatly shifted relative to the locations of the foci of the optical elements, so that $L_2$ directly produces the image of the target plate of the luminance tube on the screen and hence the optical element 14 may be dispensed with.

I claim:

1. An amplitude modulator for a light beam emitted from a source, comprising means for polarizing and dividing said light beam, first and second polarization varying means each having a single valued, reversible, polarization shift versus applied signal characteristic, said first polarization varying means varying the direction of polarization of each of said component light beams respectively in accordance with the amplitude of respective applied signals, means for recombining said so varied component light beams into a single light beam, said second polarization varying means varying the direction of polarization of said recombined light beam in accordance with an applied signal thereby to algebraically add additional phase shift to said recombined light beam in accordance with said applied signal, and means for analyzing the resultant polarization of said recombined light beam.

2. An amplitude modulator as claimed in claim 1 wherein said dividing means comprises means for dividing said light beam into three primary color components, said signals applied to said first means being representative of the selected intensity of said three primary colors, and said signal applied to said second means being a luminance signal.

3. An amplitude modulator as claimed in claim 1 wherein said polarizing means is positioned nearer the light source than said dividing means.

4. An amplitude modulator as claimed in claim 1 wherein said dividing and recombining means each comprises dichroic mirrors.

5. An amplitude modulator as claimed in claim 1 wherein said first and second means for varying polarization each comprises optical relays.

6. An amplitude modulator as claimed in claim 1 further comprising means for projecting said recombined light beam.

7. An amplitude modulator as claimed in claim 1 wherein said dividing means divides the light beam into three color components, said first polarization means comprises three optical relays each for shifting the phase of one of said color components of said color components of said light respectively.

8. An amplitude modulator as claimed in claim 7 wherein said three optical relays have applied narrow-band signals representative of color signals respectively and said second polarization varying means has applied a wide band luminance signal.

9. An amplitude modulator as claimed in claim 7 further comprising an image transport system located between said three optical relays and said second polarization varying means.

10. An amplitude modulator as claimed in claim 7 further comprising a first lens located between said source and said three optical relays, and a second lens located between said three optical relays and said second polarization varying means.

11. An amplitude modulator for a light beam emitted from a source, comprising means for polarizing said light beam, a plurality of means for varying the direction of the polarization of the light beam in accordance with the amplitude of an applied signal, each of said polarization varying means having a single valued, reversible, polarization shift versus applied signal characteristic, a plurality of means for permitting all but one of said polarization shift means to vary the polarization of only a single selected color component of the light beam, means for algebraically adding said phase variation including means for serially coupling said polarization shift means, and means for analyzing the polarizing of the last of said serially coupled polarization shift means.

12. An amplitude modulator as claimed in claim 11 wherein each of said polarization varying means comprises an optical relay having a crystalline plate.

13. An amplitude modulator as claimed in claim 12 wherein each of said permitting means comprises a dichroic mirror integrally mounted to said plate.

14. An amplitude modulator as claimed in claim 11 wherein said serial connecting means comprises an image transport system.

UNITED STATES PATENT AND TRADEMARK OFFICE

CERTIFICATE OF CORRECTION

PATENT NO. : 3,588,324

DATED : June 28, 1971

INVENTOR(S) : JERARD MARIE

It is certified that error appears in the above-identified patent and that said Letters Patent are hereby corrected as shown below:

IN THE TITLE PAGE after "58739" insert -- January 19, 1967 91793 --;

Signed and Sealed this eleventh Day of November 1975

[SEAL]

Attest:

RUTH C. MASON
*Attesting Officer*

C. MARSHALL DANN
*Commissioner of Patents and Trademarks*

UNITED STATES PATENT AND TRADEMARK OFFICE

CERTIFICATE OF CORRECTION

PATENT NO. : 3,588,324

DATED : June 28, 1971

INVENTOR(S) : GERARD MARIE

It is certified that error appears in the above-identified patent and that said Letters Patent are hereby corrected as shown below:

IN THE TITLE PAGE change "Jerard" to -- Gerard --;

under "58739" insert -- January 19, 1967
France
91793 --;

Signed and Sealed this

Sixteenth Day of November 1976

[SEAL]

*Attest:*

RUTH C. MASON
*Attesting Officer*

C. MARSHALL DANN
*Commissioner of Patents and Trademarks*